Nov. 1, 1955 E. WENNERBO ET AL 2,722,426

PHONOGRAPHS

Filed March 19, 1951

INVENTOR
ERIK WENNERBO and
FRITZ A. SVENSSON
By: Young, Emery & Thompson
Attys.

United States Patent Office 2,722,426

Patented Nov. 1, 1955

2,722,426

PHONOGRAPHS

Erik Wennerbo and Fritz August Svensson, Motala, Sweden, assignors to Industriaktiebolaget Luxor, Motala, Sweden, a corporation of Sweden Application March 19, 1951, Serial No. 216,288

Claims priority, application Sweden March 28, 1950

1 Claim. (Cl. 274—15)

Figure 1:
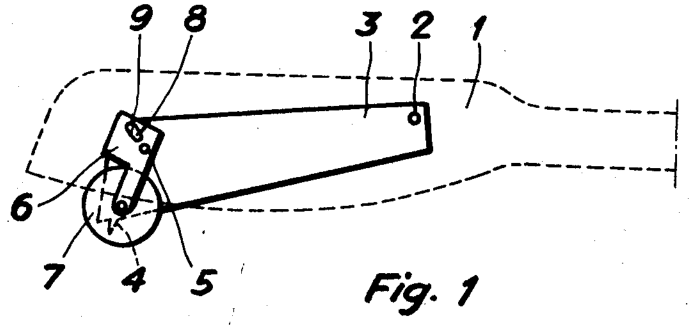

The present invention relates to an arrangement in connection with the tone arm of a phonograph for automatically placing the phonograph needle in the correct initial playing position on a record to be played irrespective of the size thereof. Such arrangements are known comprising a support which is movable between an upper, or inactive, position which it occupies during the playing of a record and in which the support is located above the horizontal plane through the needle point, and a lower, or active, position which it occupies when the tone arm is lowered towards a record and in which the lower portion of said support is located below the horizontal plane through the needle point. The latter is to prevent the phonograph needle from engaging the sound groove of the record until the tone arm has been swung outwards sufficiently to cause said support to drop down at the edge of the record thus allowing the tone arm to move further downwards.

The object of the present invention is to provide simple and reliable means for automatically moving said support between its two positions on the tone arm.

With this object in view according to the present invention the phonograph needle is carried by a movable member which on raising the tone arm from a record on the turntable tends to move to a lower end position relatively to the tone arm head, the support being mechanically coupled to said movable member and to the tone arm in such a manner that the support will occupy its lower, or active, position when the said needle-carrying movable member is in its lower end position relatively to the tone arm head and will be moved to its upper, or inactive, position, when said movable member is moved to its upper end position relatively to the tone arm head.

For the explanation of the invention reference is had to the accompanying diagrammatic drawings showing a preferred embodiment of the new arrangement.

Figure 2:
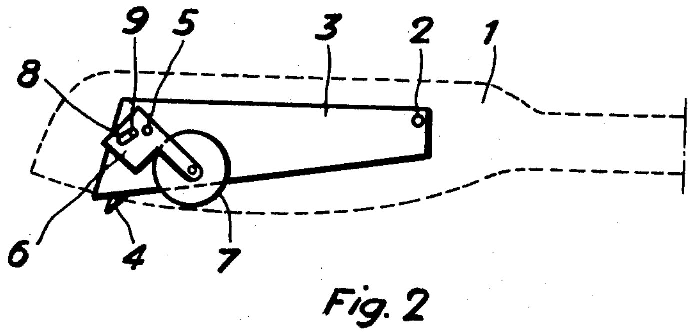

In the drawings:

Fig. 1 is a side view of the arrangement with the support in its lower, or active, position; and Fig. 2 shows in a similar manner the arrangement with the support in its upper, or inactive, position.

In the drawings 1 designates the head of a tone arm. Through this head a transverse shaft 2 extends. On the shaft 2 one end of a holder 3 for the needle system is swingably mounted, the needle being shown at 4. Adjacent the other end of the needle-carrying holder 3 a pin 5 is fixed to the same, and on this pin there is rotatably mounted a two-armed lever 6, one arm of which carries a support in the form of a rotatably mounted roller 7, whereas the other arm of said lever is provided with a slot 8. A pin 9 secured to the tone arm head 1 extends through this slot 8.

It is supposed that the tone arm 1 is mounted on a record changing phonograph of the type in which the records are fed one at a time to the turntable and are stacked on the latter. The operation of the described mechanism then is as follows.

During the playing of a record the various parts of the mechanism in the tone arm head 1 occupy the position shown in Fig. 2, i. e. the holder 3 has been turned to an upper end position relatively to the tone arm head 1 with the needle 4 engaging the sound groove of the record and with the roller-carrying lever 6 turned to its right hand end position so that the roller 7 is located above the horizontal plane through the point of the needle 4.

When the playing of the record has been concluded the tone arm 1 is automatically raised from the record by the driving mechanism of the phonograph and is swung laterally clear of the turntable (not shown).

During this raising movement of the tone arm the holder 3 under the influence of its own weight swings counter-clockwise about the shaft 2 relatively to the tone arm head 1 to the position shown in Fig. 1. Through the cooperation of the pin 9 attached to the tone arm head 1 with the slot 8 in the lever 6 this lever is simultaneously turned clockwise to the position shown in Fig. 1, i. e. the roller 7 is swung downwards so that the lower portion thereof will be located below the horizontal plane through the point of the needle 4, as shown.

After a new record has been fed to the turntable the driving mechanism of the phonograph swings the tone arm 1 inwards over the turntable and lowers the same towards the new record at a radial distance from the centre thereof which, at the very most, corresponds to the radius of the first convolution of the sound groove of a record of the smallest size intended to be played.

When the tone arm is thus lowered the roller 7 will be placed on the record (position of the roller shown in Fig. 1). As appears from the drawing, the holder 3 forms a knee-joint with the roller-carrying arm of the double-armed lever 6, the roller axis being located to the left of the axis of said knee-joint and the pin 9 attached to the tone arm head 1 contacting the knee in such a manner that the same does not collapse.

As known per se the shaft of the roller 7 may form an angle with the radius of the record drawn through the point of engagement of the same with the roller so that, when the record rotates, the roller tends to move along a spiral path outwards on the record thereby swinging the tone arm 1 outwards. When the roller 7 reaches the edge of the record it drops down, permitting the needle 4 to engage the record. The radial distance between the roller 7 and the needle 4 is so chosen that the needle will then engage one of the first convolutions of the sound groove in the record.

When the needle 4 is applied against the record the holder 3 under the influence of the weight of the tone arm will be swung clockwise about the shaft 2 relatively to the tone arm head 1 from the position shown in Fig. 1 to the position shown in Fig. 2. Due to this relative movement between the holder 3 and the tone arm head 1 the lever 6 by the cooperation of the pin 9 with the slot 8 will simultaneously be turned counter-clockwise about its pin 5 from the position shown in Fig. 1 to the position shown in Fig. 2 in which latter position the roller 7 is located wholly above the horizontal plane through the point of the needle 4.

The device as above described can of course be used also as a repeating mechanism in phonographs not provided with an automatic record changer. In such a case it is only necessary to have some sort of mechanism which after the playing of the record has been concluded raises the tone arm and then lowers the same towards the record. When the tone arm is raised, the roller 7 will be swung downwards into the active position shown in Fig. 1, so that, when the tone arm is thereupon lowered, it will engage the rotating record and in cooperation therewith will cause the tone arm to be swung outwards until the roller 7 drops down at the edge of the record whereupon the playing of the record is started again.

The support 7 need not consist of a roller but can also be formed as a sled or runner sliding on the record. Such a sled or runner will operate in quite the same manner as a roller but for the fact that it is not able, in cooperation with the rotating record, to swing the tone arm outwards. Instead this swinging movement must be effected by the driving mechanism of the phonograph in some other way.

Modifications of the arrangement as above described are conceivable within the scope of the appended claim. Thus, the holder 3 for the needle system instead of being rotatably connected to the tone arm head may also be mounted slidable in vertical guides therein. The arm 6 carrying the roller 7 may be pivotally connected to the tone arm head 1 instead of to the holder 3, the pin and slot connection being then provided between said arm 6 and the swingable holder 3.

We claim:

In combination with the tone arm of a phonograph, a member carrying the phonograph needle rotatably mounted in the tone arm for movement in a vertical plane, an elongated tone arm support having one end rotatably mounted in a vertical plane on said member and the other end carrying a pivot, and a rotatable wheel on said pivot to engage the record on the turntable to carry the stylus to the initial playing groove of said record, said support being connected to the tone arm by a pin and slot connection, said slot in cooperation with said pin limiting the rotation of said support about its mounting in said member in two opposite directions, in one of said limit positions said support being located with said wheel above the stylus point and in the other limit position being located with said wheel below the stylus point, and said pivot on the support for the wheel in the two limit positions being located on opposite sides of a vertical line through said support mounting in said member.

References Cited in the file of this patent

UNITED STATES PATENTS

| | | |
|---|---|---|
| 1,538,667 | Smith | May 19, 1925 |
| 1,629,986 | Battey et al. | May 24, 1927 |
| 2,215,925 | Hammer | Sept. 24, 1940 |
| 2,504,596 | Scriven et al. | Apr. 18, 1950 |
| 2,586,422 | Fisher | Feb. 19, 1952 |

FOREIGN PATENTS

| | | |
|---|---|---|
| 103,523 | Great Britain | Jan. 31, 1917 |
| 554,282 | Great Britain | June 28, 1943 |